US012642245B2

(12) United States Patent
Mohr

(10) Patent No.: US 12,642,245 B2
(45) Date of Patent: Jun. 2, 2026

(54) DARK-OUT BOX FOR AGRICULTURAL VENTILATION

(71) Applicant: GrainProteinTech Climate Control Air Treatment US LLC, Wilmington, DE (US)

(72) Inventor: Thomas Mohr, Swartz Creek, MI (US)

(73) Assignee: GrainProteinTech Climate Control Air Treatment US LLC, Wilmington, DE (US)

( * ) Notice: Subject to any disclaimer, the term of this patent is extended or adjusted under 35 U.S.C. 154(b) by 452 days.

(21) Appl. No.: 18/132,887

(22) Filed: Apr. 10, 2023

(65) Prior Publication Data

US 2024/0334895 A1 Oct. 10, 2024

(51) Int. Cl.
*A01K 1/00* (2006.01)

(52) U.S. Cl.
CPC .......... *A01K 1/0064* (2013.01); *A01K 1/0017* (2013.01)

(58) Field of Classification Search
CPC .... A01K 1/0047; A01K 1/0064; A01K 31/22; F24F 2007/0025; F24F 7/007; F24F 7/013; F24F 13/08; F24F 13/082; Y10S 454/905; E06B 9/24; E06B 3/362; E06B 9/04; E06B 9/26; F04D 25/14
See application file for complete search history.

(56) References Cited

U.S. PATENT DOCUMENTS

| | | | | |
|---|---|---|---|---|
| 3,285,156 A | * | 11/1966 | Bohanon | F24F 13/08 55/440 |
| 4,989,502 A | * | 2/1991 | Ospelt | F24F 13/08 454/313 |
| 5,036,797 A | | 8/1991 | Koozer | |
| 5,238,451 A | | 8/1993 | Wulf et al. | |

(Continued)

FOREIGN PATENT DOCUMENTS

| | | |
|---|---|---|
| EP | 0609727 B1 | 8/1997 |
| WO | 2018/009968 A1 | 1/2018 |
| WO | 2019/179992 A1 | 9/2019 |

OTHER PUBLICATIONS

Brentwood Industries, Inc., Light Traps, [online], [retrieved on Mar. 16, 2023], Retrieved using Internet <URL: https://www.brentwoodindustries.com/cooling-tower/light-traps/>.

(Continued)

*Primary Examiner* — Steven B McAllister
*Assistant Examiner* — Michael James Giordano
(74) *Attorney, Agent, or Firm* — RAY QUINNEY & NEBEKER; Daniel J. Bezdjian

(57) ABSTRACT

A dark-out apparatus is provided for use with a ventilation fan disposed on the wall of an agricultural building for passing ventilation air from one side to the other. The dark-out apparatus includes light-trapping media and first and second door members for holding the light-trapping media and being movable between open and closed positions and being openable away from the wall. When in the closed positions, the first and second door members cover a (Continued)

ventilation port of the fan, and when in the open positions, the first and second door members expose the ventilation port. When in the closed positions, distal sides of the first and second door members define an air gap. The air gap allows ventilation air to pass through, but does not allow ambient exterior light to pass through.

19 Claims, 9 Drawing Sheets

(56)             References Cited

U.S. PATENT DOCUMENTS

| 5,277,658 | A | | 1/1994 | Goettl |
| 6,481,380 | B1 | * | 11/2002 | Barnett, Sr. .......... A01K 1/0047 |
| | | | | 119/448 |
| 7,611,403 | B2 | | 11/2009 | Wenger |
| 9,816,525 | B1 | * | 11/2017 | Sadler ..................... F04D 25/12 |
| 11,573,017 | B2 | | 2/2023 | Smith et al. |
| 2008/0233861 | A1 | | 9/2008 | Jenkins et al. |
| 2010/0099349 | A1 | * | 4/2010 | Gohring ................. F24F 13/18 |
| | | | | 49/92.1 |
| 2017/0198939 | A1 | | 7/2017 | Teeters |

OTHER PUBLICATIONS

J & D Manufacturing, Light Trap Combination System, [online], [retrieved on Mar. 14, 2023], Retrieved using Internet <URL: https://jdmfg.com/product/light-trap-combination-system/?application= exhaust-fans&application_cat=poultry>.

* cited by examiner

DARK-OUT BOX FOR AGRICULTURAL VENTILATION

CROSS-REFERENCE TO RELATED APPLICATIONS

None

FIELD OF THE INVENTION

The present invention relates to agricultural ventilation and lighting, particularly that used in poultry and livestock buildings.

BACKGROUND OF THE INVENTION

Lighting and ventilation control is important for the growth of animals in poultry and livestock buildings. This is particularly true for poultry raised in layer houses for egg laying poultry and broiler houses for poultry for human consumption. Ventilation control is critical to maintain target temperatures to maximize poultry growth. Building temperatures can vary depending on various factors, such as number and sizes of the animals, outdoor temperature and humidity, weather conditions, etc. Maintaining building temperatures at target temperatures is generally effected using circulation and ventilation fans. Circulation fans are typically suspended from building ceilings to produce localized air circulation, whereas ventilation fans are typically mounted on the walls of the building with to draw ventilation air therethrough. Without some type of restriction, exterior light can pass through the fan passages of the ventilation fans.

Lighting in agricultural buildings is provided by artificial interior lighting and pass-through of ambient external light. Agricultural science has developed specific lighting programs for controlling light inside the house to maximize animal health and growth. As one example, for a flock of poultry, during the first stage of a bird's life (brooding), lights are typically on full bright for one to two weeks. The lights are then slowly dimmed per the program requirements until the end of the flock. At this point, the lights are set to a very dim level.

As noted above, control of the lighting in agricultural buildings is important for growth and health of animals like poultry. It is important to keep the buildings very dark and avoid unwanted light, especially at the end of the flock when the birds are nearing market size. If the light levels are properly controlled, the birds continue to eat, but do not move around excessively and burn off ingested food. Thus, consistent and precise lighting control allows flocks to increase weight without wasting excess feed in the process.

While light control and ventilation control are both important for livestock growth and health, they can counteract one another. For example, many types of lighting can generate heat, whereas ventilation fans can let ambient light stream into the livestock building when operating and shutters are opened. The streaming light can reach far into the agricultural building and disrupt the lighting levels required by the program.

In order to eliminate or minimize ambient light leaking through ventilation fans, various light control products are available on the market. These products are typically known as light traps and are positioned between the ventilation fan housing and the ventilation port in the building wall. Note, for example, the commercial light trap modules available from Brentwood Industries, Inc. Light traps using these modules can eliminate light intrusion at the fans without a significant reduction in airflow. However, if these products are fixed to the building walls, they may restrict access to the fans and they will have to be removed to allow such access or to let in light when desired for a particular growth stage of the animals. Accordingly, there is a need for a product that can achieve a desired balance between light and ventilation control simultaneously.

SUMMARY OF THE INVENTION

According to one aspect of the present invention, a dark-out apparatus is provided for use with a ventilation fan disposed on the wall of an agricultural building, the wall having an interior side and an exterior side, with a ventilation port passing through the wall from the exterior side to the interior side, the ventilation fan being mounted on the exterior side of the wall for passing ventilation air from one side to the other. The dark-out apparatus includes a first light-trapping medium: a first door member for holding the first light-trapping medium, the first door member being movable relative to the wall between an open position and a closed position and being openable toward the interior side of the wall, the first door member having interior and exterior faces, a top, a bottom, a hinged, proximal side, and an opposite, distal side; a second light-trapping medium; and a second door member for holding the second light-trapping medium, the second door member being movable relative to the wall between an open position and a closed position and being openable toward the interior side of the wall, the second door member having interior and exterior faces, a top, a bottom, a hinged, proximal side, and an opposite, distal side. When in the closed positions, the first door member and the second door member cover the ventilation port, and when in the open positions, the first door member and the second door member expose the ventilation port. When in the closed positions, the distal ends of the first door member and the second door member define an air gap. The air gap allows ventilation air to pass through, but does not allow ambient exterior light to pass through.

According to another aspect of the present invention, a dark-out apparatus is provided for use with a ventilation fan disposed on the wall of an agricultural building, the wall having an interior side and an exterior side, with a ventilation port passing through the wall from the exterior side to the interior side, the ventilation fan being mounted on the exterior side of the wall for passing ventilation air from one side to the other. The dark-out apparatus includes a first light-trapping member having a light-trapping function, the first light-trapping member being movable relative to the wall between an open position and a closed position and being openable toward the interior side of the wall, the first light-trapping member having interior and exterior faces, a top, a bottom, a hinged, proximal side, and an opposite, distal side; and a second light-trapping member having a light-trapping function, the second light-trapping member being movable relative to the wall between an open position and a closed position and being openable toward the interior side of the wall, the second light-trapping member having interior and exterior faces, a top, a bottom, a hinged, proximal side, and an opposite, distal side. When in the closed positions, the first light-trapping member and the second light-trapping member cover the ventilation port, and when in the open positions, the first light-trapping member and the second light-trapping member expose the ventilation port. When in the closed positions, the distal ends of the first light-trapping member and the second light-trapping member define an air gap. The air gap allows ventilation air to pass through, but does not allow ambient exterior light to pass through.

These and other aspects of the invention will become apparent from the following disclosure.

DETAILED DESCRIPTION OF THE EMBODIMENTS

Figure 1:
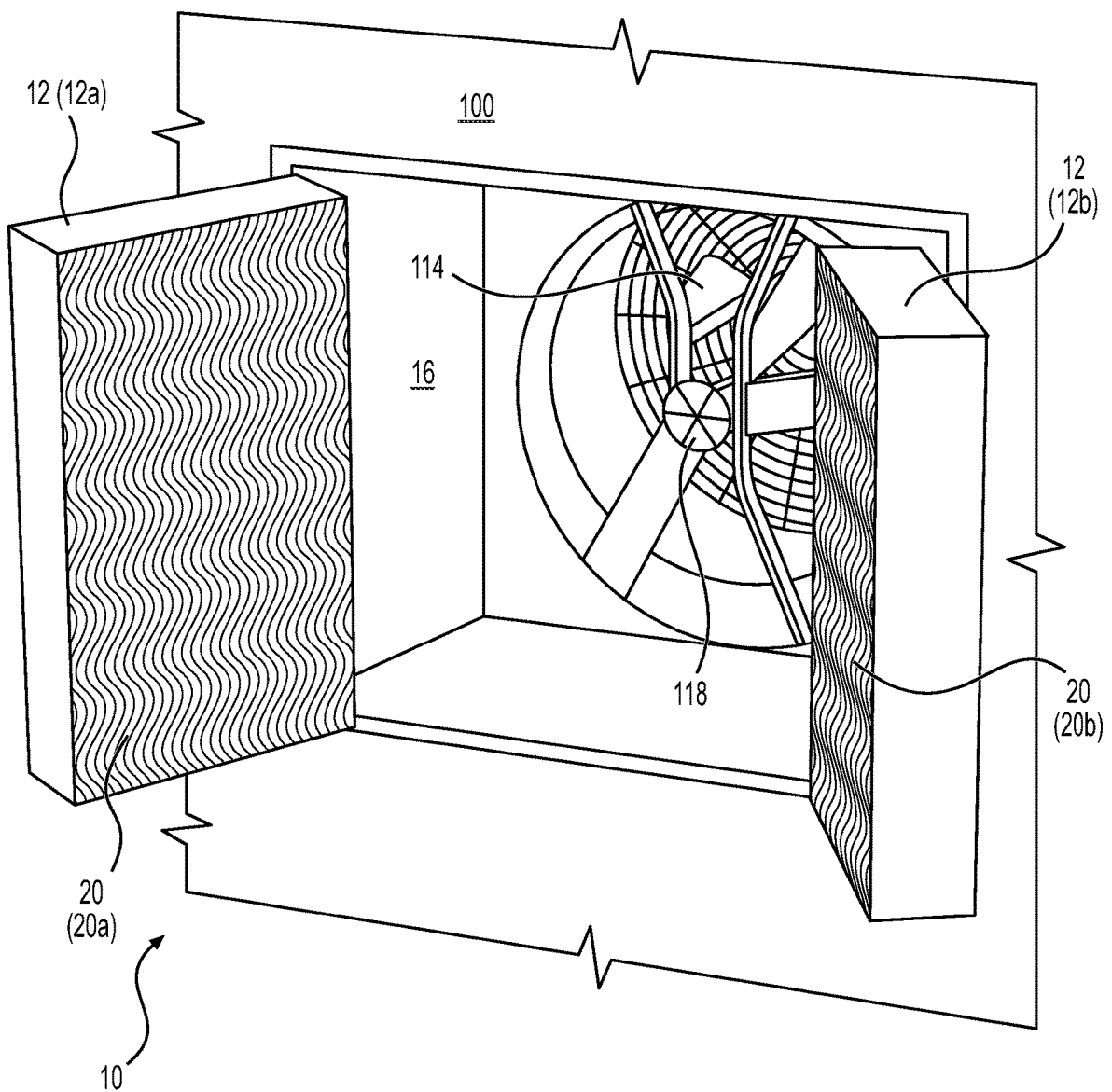
FIG. 1 is a perspective view of a dark-out apparatus, as viewed from the interior of an agricultural building, according to an embodiment of the present invention.
Figure 2:
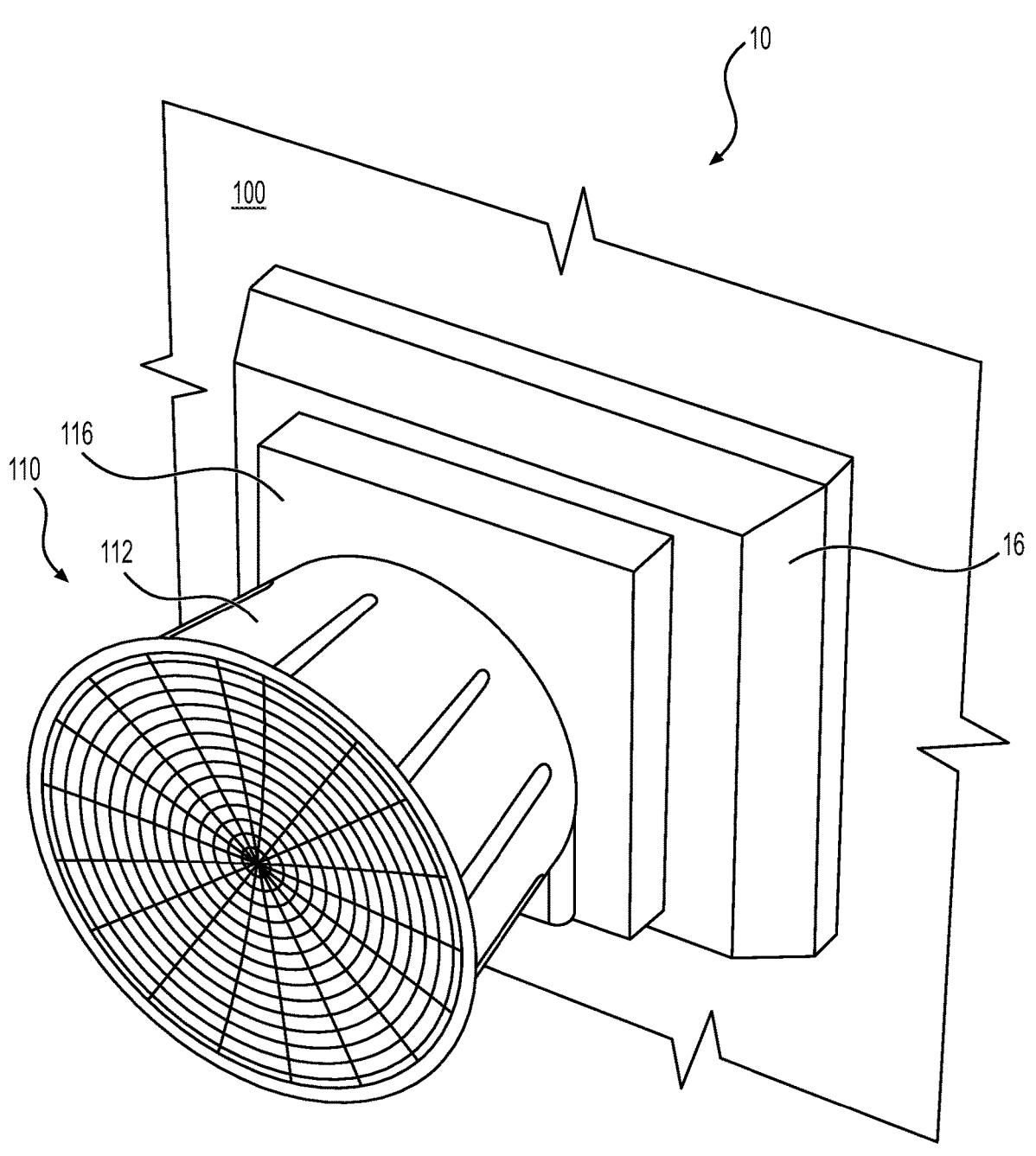
FIG. 2 is a perspective view of the dark-out apparatus according to the embodiment of the present invention as well as a wall-mounted ventilation fan unit, as viewed from the exterior of the agricultural building.

A dark-out apparatus according to an embodiment of the invention is illustrated in FIGS. 1-5, 7, and 8 and is identified generally with reference numeral 10. Referring to FIGS. 1 and 2, dark-out apparatus 10 is typically used in combination with a ventilation fan unit 110 mounted on the wall 100 of an agricultural building. Ventilation fans for agricultural buildings are typically mounted on the side wall of the building in line with a ventilation port extending through the building to allow ventilation air to pass therethrough. Examples of ventilation fans usable with the dark-out apparatus 10 of the present invention include the Vortex series of exhaust fans available from Munters Corporation, including the VX36, VX48, VX51, and VX55 belt drive and belt drive models. These models include an inlet shutter, a discharge cone, and an outlet guard. While these available ventilation or exhaust fans can be mounted directly to the agricultural building wall 100, the dark-out apparatus 10 of the present invention can also allow the ventilation fans to be mounted thereto. The dark-out apparatus of the present invention can also be used to retrofit an existing ventilation fan currently in use in an agricultural building.

Figure 3:
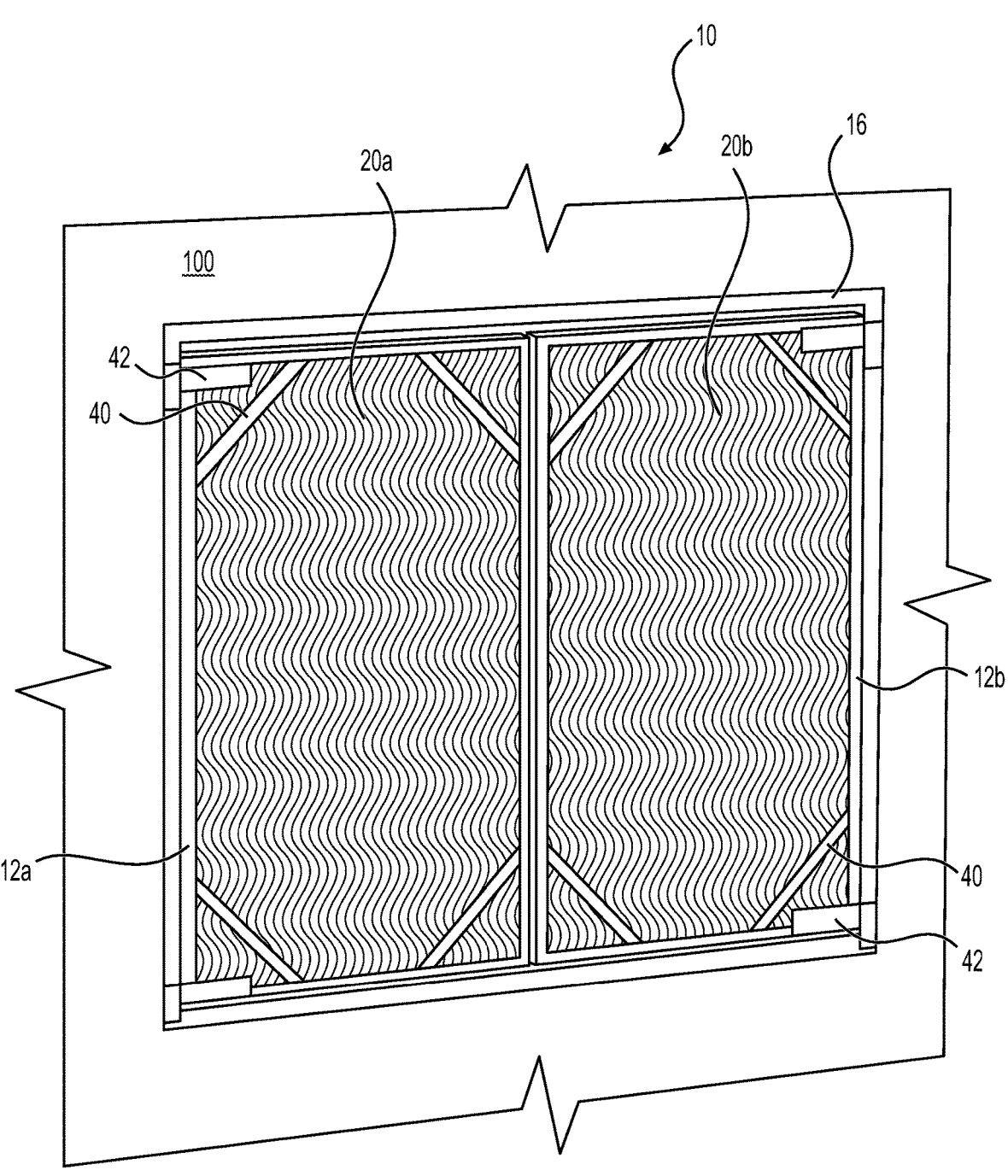
FIG. 3 is an interior perspective view of the dark-out apparatus according to the embodiment of the present invention.

Referring once more to FIGS. 1 and 2, ventilation fan 110 typically includes a discharge cone 112, fan blade 114, fan base 116, and fan motor 118. Fan base 116 can be mounted to the dark-out apparatus 10 of the present invention by any known means, including hardware such as screws, bolts, and nuts. The dark-out apparatus 10 includes first and second doors 12 (12a, 12b), housing 16, and light trap media 20 (20a, 20b). Housing 16 can be formed of any desired material as long as it can support fan 110 on the exterior and doors 12 on the interior. Fiberglass is an acceptable material for the housing, particularly if reinforced or used in conjunction with the structure of building wall 100. The ventilation port in building wall 100 can be custom-sized to accommodate the dimensions of housing 16. Each door 12 is designed to hold one or more modules of light trap media 20 and is hinged to housing 16 on either the right or left side so as to be openable and closable. In the open positions (as shown in FIG. 1), doors 12 allow access to the fan from the interior of the building for cleaning or other purposes, and can allow light into the building through the ventilation port when desired. In the closed positions (as shown in FIG. 3), doors 12 close the ventilation port and prevent light from entering the building through the ventilation port, while allowing ventilation air to pass through.

Figure 4:
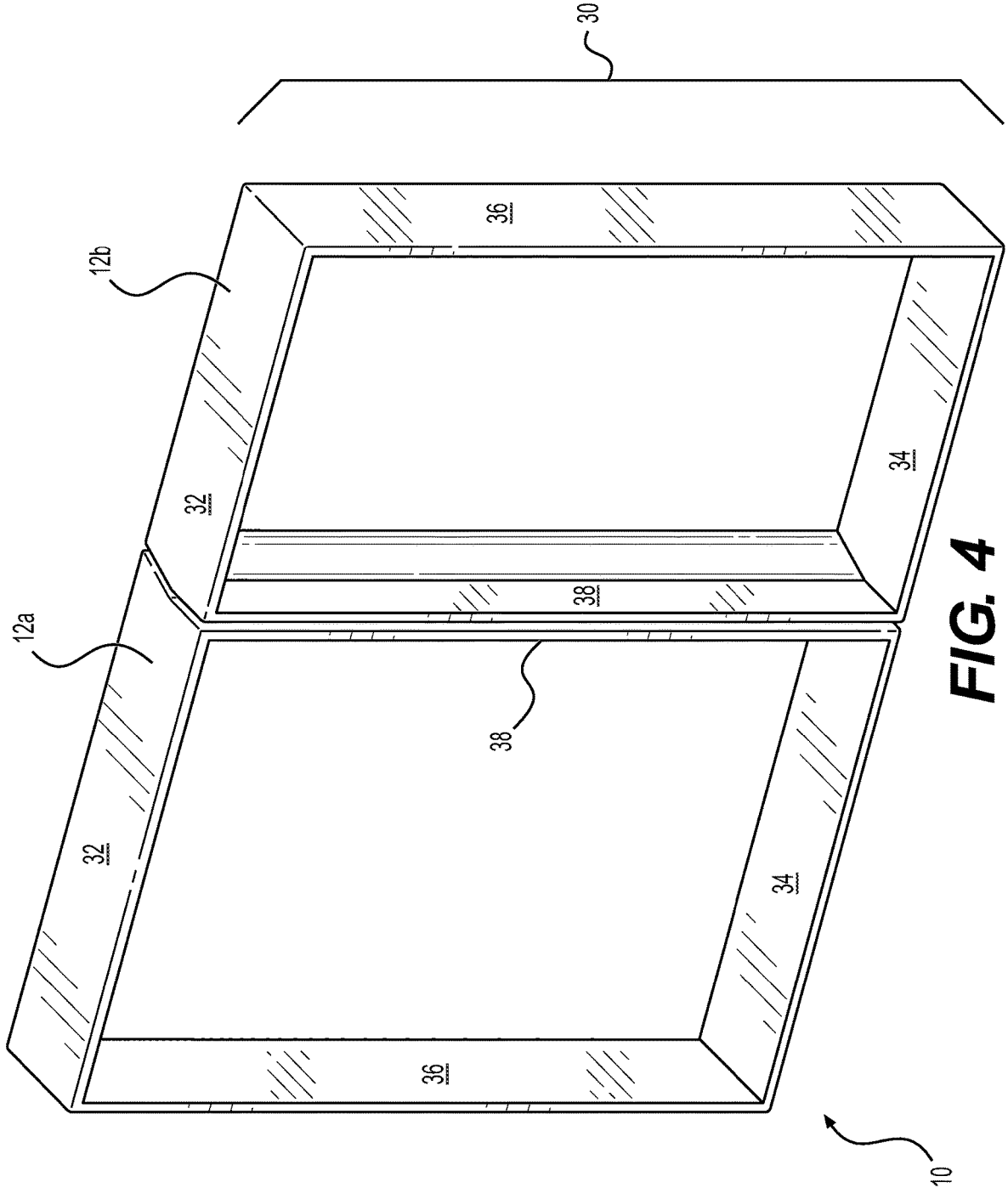
FIG. 4 is an interior perspective view of the doors of the dark-out apparatus according to the embodiment of the present invention, without any light trap media installed.

Construction of the doors 12 will be described referring to FIGS. 3-5. Doors 12 can be formed of any preferred material, and galvanized steel will be used as an example in this described embodiment. Each door 12 is formed of panels 30 configured to define the periphery of the door. In one example, each door 12 is formed of four panels 30, namely, top and bottom panels 32, 34, proximal side panels 36, and distal side panels 38. The four panels of each door can be secured together using any suitable means, such as hardware like screws, bolts, nuts, and washers, or by welding. Any suitable means can be used to connect and support the panels, such as corner brackets (not shown) at each of the four corners of each door 12. In addition, the panels 30 can be braced together using corner braces 40 in each of the four corners of the door, or with a single cross brace (unshown) that stretches across opposed corners. Proximal panels 36 of each door are hinged to housing 16 at one or more locations using hinges 42. When assembled, panels 30 of each door 12 form a hollow central space to accept the light trap media 20. Further, a latching mechanism (not shown) can be used to latch the doors in the closed positions. A door stop (not shown) can be used to hold the doors in the open positions. A latch, such as a spring-loaded latch, can be used to perform both the latching and door stop functions.

The light trap media 20 can be custom-made for the sizes of the doors, or can be acquired from any known supplier. For example, Brentwood Industries, Inc. offers light trap modules that provide light reduction with low pressure drop for black-out or dark-out ventilation applications. The light trap modules are formed of polyvinyl chloride (PVC), include a black finish for additional light absorption, and are available in various sizes. The modules can be of a blade-form or a cellular-form, both of which are compatible with the dark-out apparatus 10 of this embodiment. The blade-form light trap is formed of a series of blades connected to one another in a parallel fashion so as to form air gaps between adjacent blades. The blades are formed in a sinuous shape so as to create sinuous air gaps. This allows ventilation air to pass through, while preventing light from passing through to an acceptable degree. In some embodiments, the light trap media 20 are formed of fins of a non-linear shape. The cellular-form light trap includes a series of tubes fused together to form a cellular structure of a corrugated shape. The cellular tubes are also formed in a sinuous shape so as to create sinuous, tubular air passages. The corrugated shape of each module can eliminate seams by creating a nesting effect if plural modules are used together. The modules are typically available in depths of several inches, for example, 10-12 inches, as well as standard widths and heights. Note also products available from Munters Corporation, such as the MI-T-Dark® cellular modules and the DB Blade-style Light Trap modules. These modules can include a ¾ inch flange around the perimeter to stop edge leakage.

Light trap media 20 can be fit into the hollow space defined by panels 30 of each door 12. Media 20 can be held in the hollow space by any suitable means. For example, while the panels 30 retain the media 20 around peripheral edges a mechanism can be used to hold the media in the air flow direction. The brackets 40 can perform the additional function of holding the media in the air flow direction. Alternatively, one or more of the panels 30 can be provided with a ridge or flange to hold the media in the air flow direction. If ridges or flanges are provided, they should have minimal dimensions to effectively perform the retaining function, but not protrude too far into the airflow so as to negatively affect the air flow. For example, in dark-out apparatus 10 with doors 12 having a width of 8 feet, a height of 6 feet, and a depth of 1 foot, the ridges or flanges should protrude no more than 1 inch into the hollow space, and preferably less than ½ inch. The doors 12 can be sized to accommodate specific sizes of dark-out media modules. For example, if the modules have a width of 12 inches and it is desired to have one door 12a sized to accommodate three modules and the other door 12b accommodate two modules, then the one door would be designed to have a 3 foot width while the other door would have a 2 foot width. The height of each door 12 would also be designed to accommodate the height of the media modules 20. Alternatively, the modules can be custom-sized to accommodate the size of the doors. As a further modification, the media modules 20 can be integrated with the doors 12 and not be separately removable components.

Figure 7:
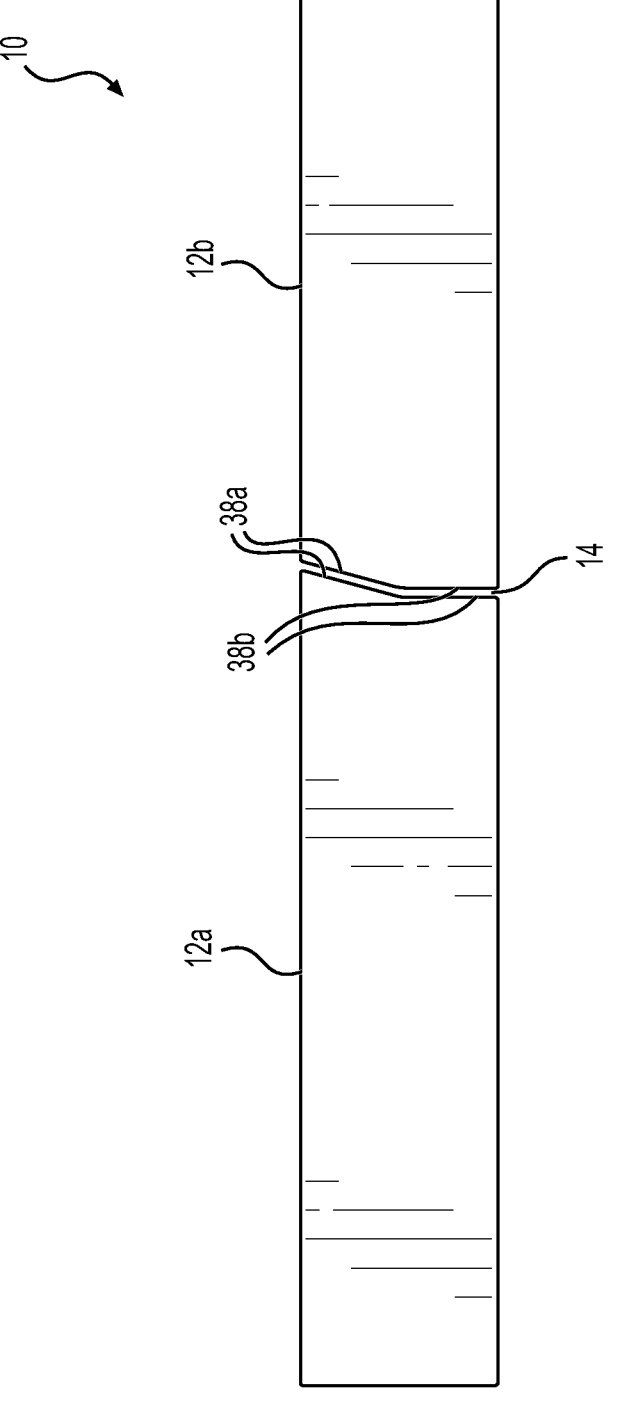
FIG. 7 is a top view of the dark-out apparatus according to the embodiment of the present invention.
Figure 8:
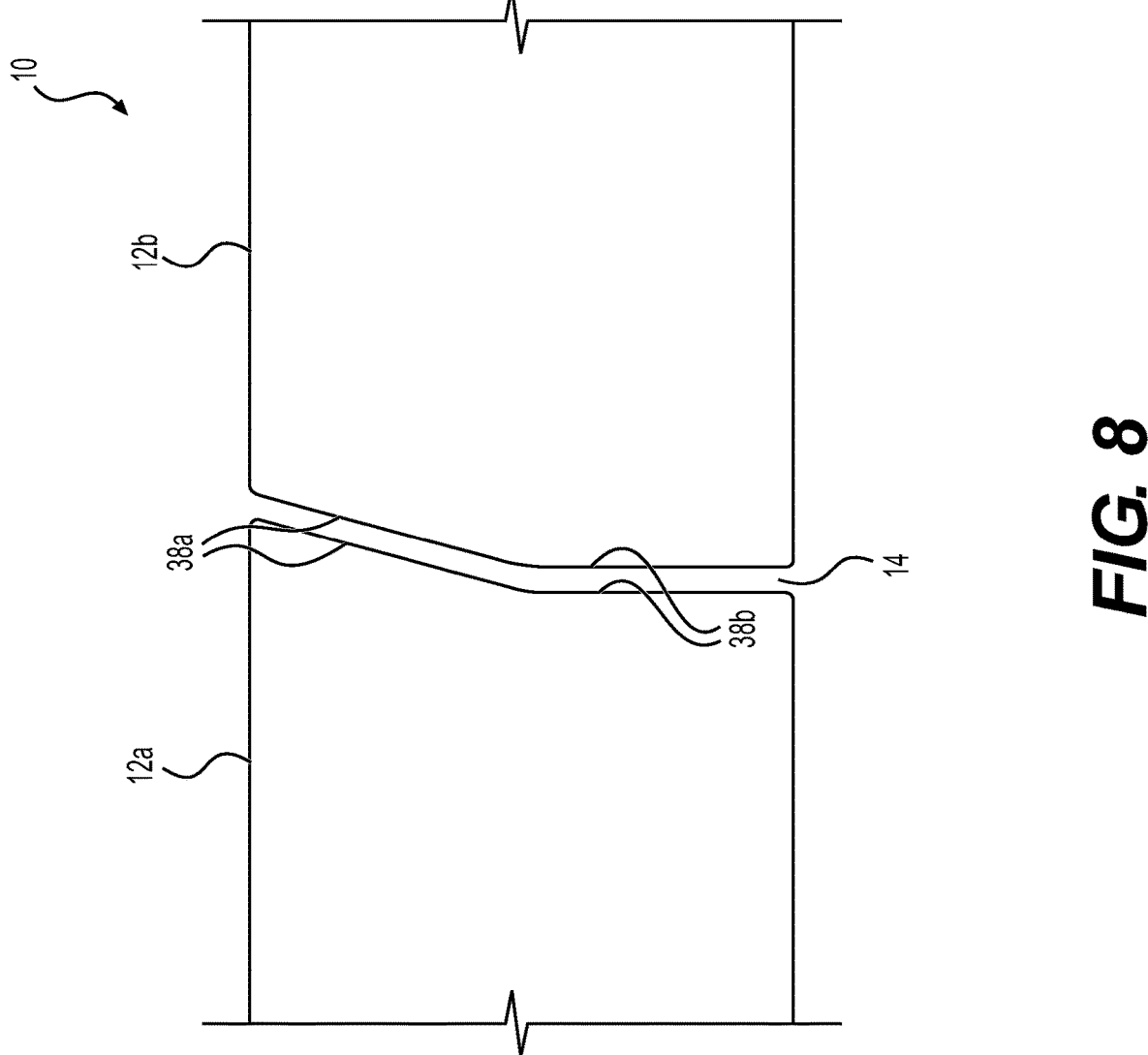
FIG. 8 is an enlarged section of the top view of the dark-out apparatus shown in FIG. 7.

When the light trap media 20 is installed or mounted in the doors 12, the doors will effectively prevent light from passing therethrough. When in the closed positions, the doors 12 will effectively prevent light from passing through the ventilation port. When in the closed positions, however, a gap 14 must be provided between the distal ends 38 of each door 12a, 12b to provide sufficient tolerance to allow the doors to close. If this gap 14 is too small, then the air flow through that region of the dark-out apparatus 10 would be restricted more than desired. Further, while a smaller gap 14 may reduce light passing through, an undesired amount of light would still nevertheless pass through without any preventive measures. If the gap 14 is too large, while the doors 12 could freely open and close, and the restriction of airflow at that location would be minimized, an even greater amount of light would pass through, diminishing the effectiveness of the light trap media 20. One aspect of the present invention is to design the gap 14 between the distal side panels 38 of the doors 12 so as to provide sufficient tolerance to allow the doors to close freely and provide a sufficient gap to allow ventilation air to flow freely, yet prevent undesired light from passing through the gap. Referring to FIGS. 7 and 8, one design of gap 14 defined by the distal ends 38 of doors 12 is shown.

In the example of FIGS. 7 and 8, the distal side panels 38 of doors 12 a, 12 b are designed to complement one another and form a non-linear gap 14. In particular, the distal side panel 38 of each door 12 is formed with a first planar section 38a and a second planar section 38b that are bent at an angle greater than zero degrees. This angle is selected so that any ray of light that emanates from the exterior side of door 12 cannot pass through gap 14 without hitting one of distal sides 38 defining gap 14. That is, an imaginary straight line cannot be drawn from one side (e.g., the exterior side) of gap 14 all the way to the other side (e.g., the interior side) without intersecting at least one of distal sides 38. Distal side panels 38 can be provided with light-absorbing characteristics, such as a black coating, to further enhance the light-absorbing effect. The spacing between distal ends 38 should be sufficient to allow ventilation air to freely pass through with minimal pressure loss. For example, for a door 12 having a width of 8 feet, a height of 6 feet, and a depth of 1 foot, the gap should range from 0.5 to 0.75 inches. While the angle of the gap is not limiting, the straighter the gap, the less the pressure loss. Accordingly, the angle between sections 38a and 38b of opposing distal panels 38 should be as small as possible while still preventing the imaginary straight line between the interior and exterior sides of the door 12 as described above so as to maintain the light trapping effect. The range of the angle is not to be limiting but can be determined by one of ordinary skill in the by balancing air flow efficiency with light blocking effectiveness. In embodiments wherein the first and second light-trapping media 20a, 20b are formed of fins of a non-linear shape, the complementary shapes of the distal sides of the first door 12a and the second door 12b are similar to the non-linear shape of the fins.

Figure 9:
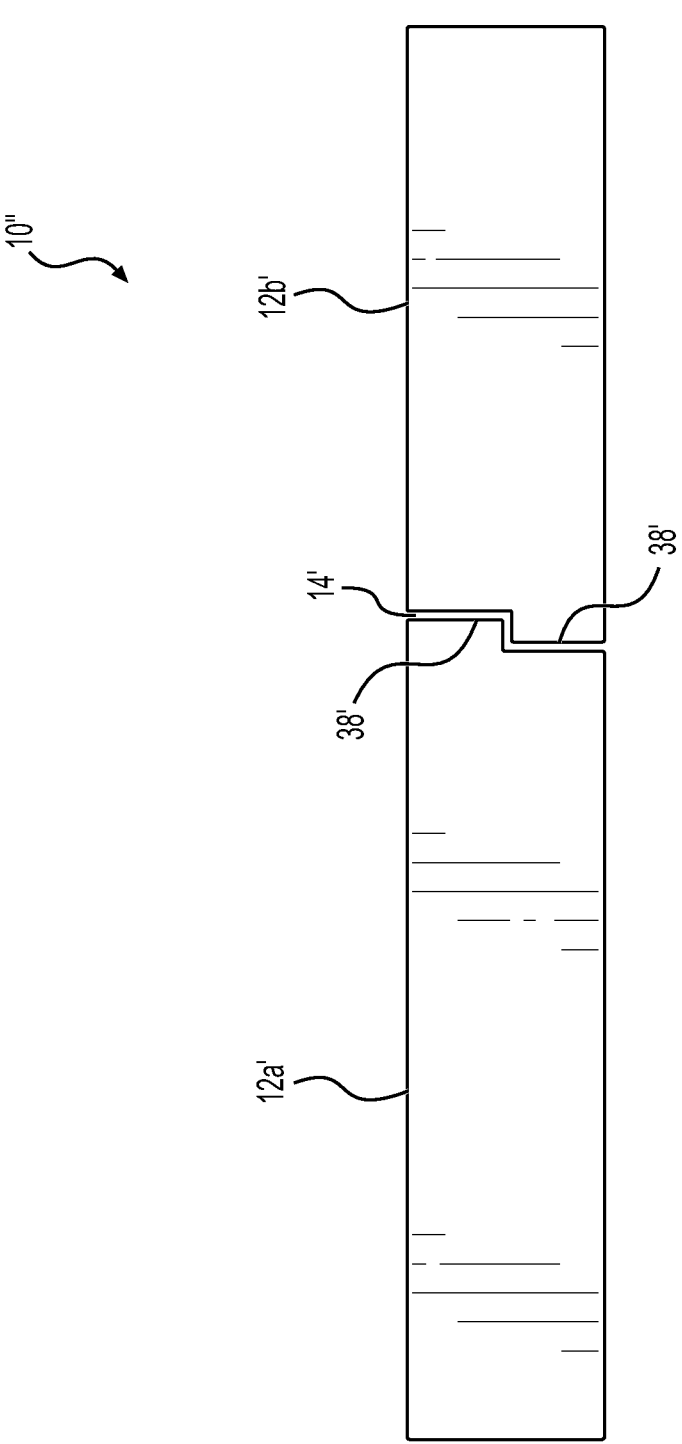
FIG. 9 is a top view of another modification of the dark-out apparatus according to the present invention.

The shape of the gap is not to be limited to that shown in FIGS. 7 and 8. For example, rather than a rectilinear bend as shown in FIGS. 7 and 8, the gap can be formed as a smooth curve of any desired radius as long as the doors can be swung to the closed position. It should be noted that the more complex the shape of the gap 14, the greater the light trapping effect at the gap, but also the greater the pressure loss of ventilation air through the gap. A rectilinear gap 14' can be formed between distal side panels 38' as shown in the dark-out apparatus 10" of FIG. 9, for example. This will provide an enhanced light trapping effect, but will have a greater pressure drop than that of the previous embodiment. The shape of the gap can also mimic that of the light blocking media 20. As noted above, one of ordinary skill in the art can balance air flow efficiency and light trapping effectiveness to design a gap 14 of a desired form.

Figure 5:
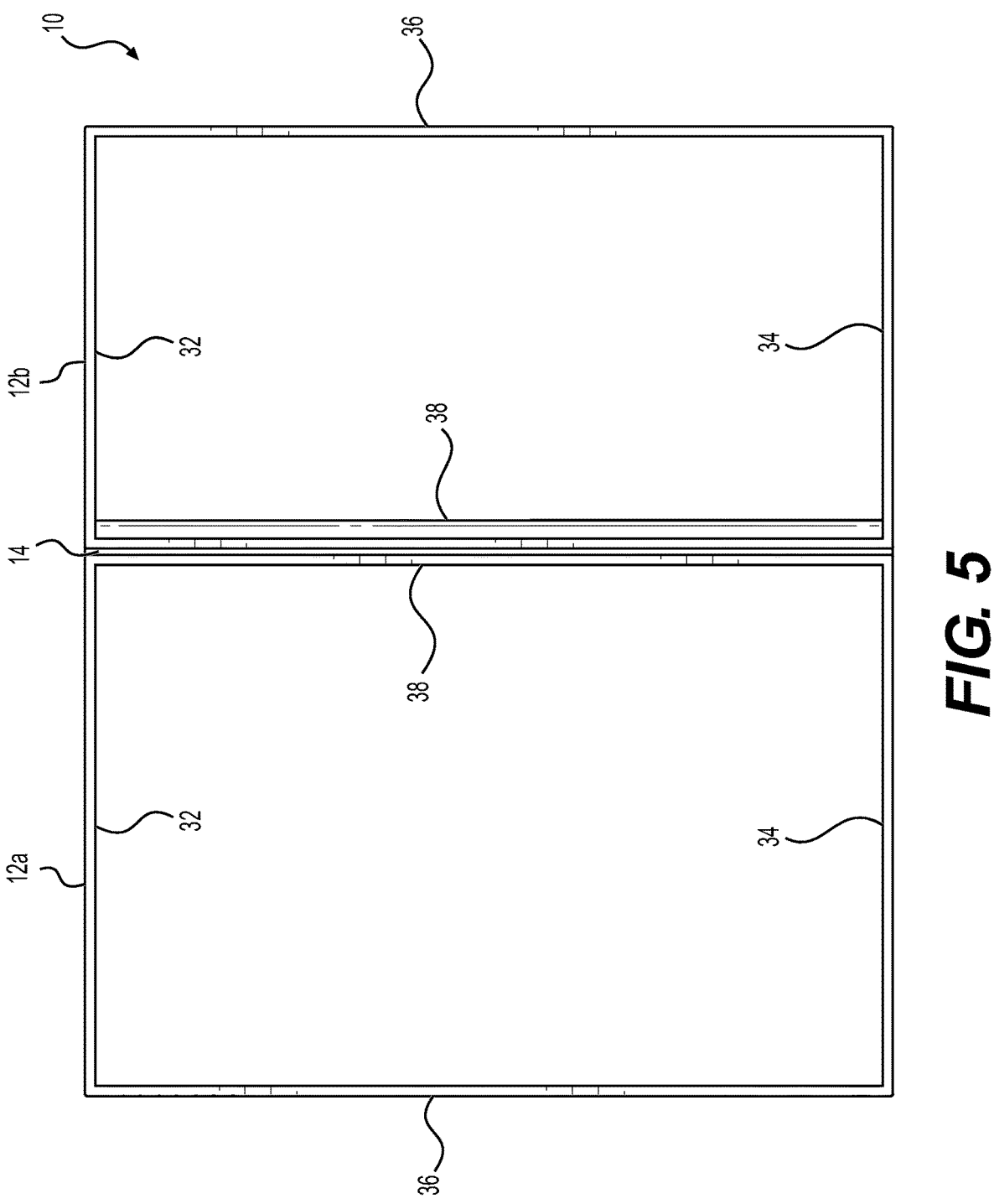
FIG. 5 is an interior elevation view of the doors of the dark-out apparatus according to the embodiment of the present invention, without any light trap media installed.
Figure 6:
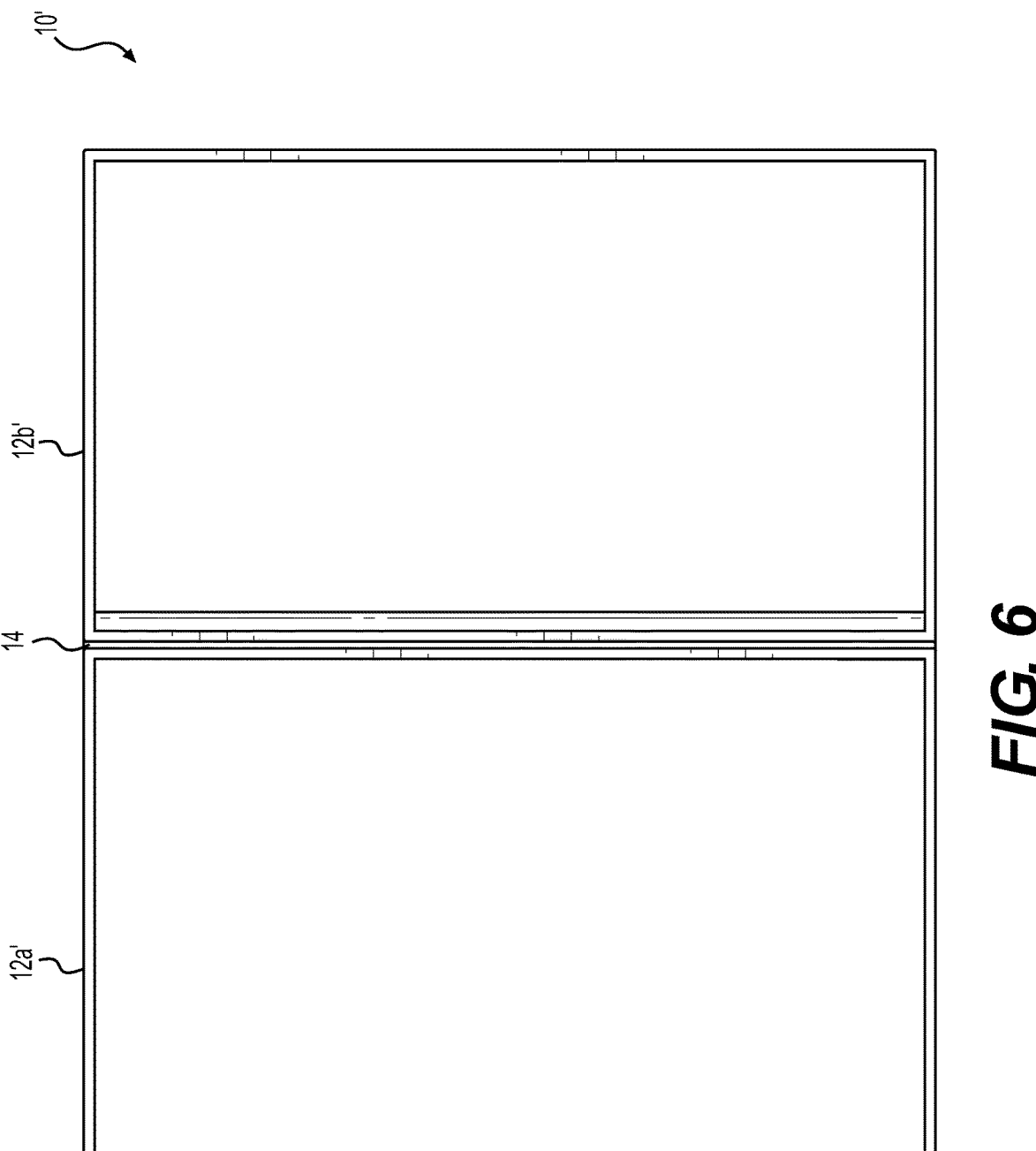
FIG. 6 is an interior elevation view of the doors of the dark-out apparatus according to a modification of the embodiment of the present invention, without any light trap media installed.

In the first embodiment, door 12a is formed of a greater width than door 12b, as shown in FIG. 5, for example. This can allow the thinner door 12b to be opened to provide access to the fan while not protruding as far into the building space as the wider door 12a would. The doors 12 need not be formed of different widths and doors of the same width can be used, as shown in the dark-out apparatus 10' of FIG. 6.

In some ventilation fans, the inlet shutter remains closed when the fan is idle and opens when activated. When the shutter is closed, light and ambient air is restricted from entering the space. When the fan is activated to allow ventilation, the shutter is opened, but the dark-out apparatus 10 effectively blocks light from entering the agricultural building while allowing air to flow freely therein. As such, the apparatus 10 allows for adequate ventilation without disrupting the planned lighting program.

The foregoing embodiments have included an arrangement in which the fan 110 is disposed on the exterior of the agricultural building, while the dark-out apparatus 10 is disposed substantially in the interior of the building. The invention is not to be limited thereto and can include an arrangement in which the fan 110 is provided inside the building and the dark-out apparatus is provided substantially outside. The present invention can also be used in an arrangement without fans, such as in a vent in a building to allow free flow of air when light trapping is desired.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A dark-out apparatus for use with a ventilation fan disposed on the wall of an agricultural building, the wall having an interior side and an exterior side, with a ventilation port passing through the wall from the exterior side to the interior side, the ventilation fan being mounted on the exterior side of the wall for passing ventilation air from one side to the other, the dark-out apparatus comprising:
  a first light-trapping media;
  a first door member for holding the first light-trapping media, the first door member being movable relative to the wall between an open position and a closed position and being openable away from the wall, the first door member comprising:
    a first top panel;
    a first bottom panel;
    a first proximal side panel extending between the first top panel and the first bottom panel; and
    a first distal side panel extending between the first top panel and the first bottom panel;
  a second light-trapping media; and
  a second door member for holding the second light-trapping media, the second door member being movable relative to the wall between an open position and a closed position and being openable away from the wall, the second door member comprising:
    a second top panel;
    a second bottom panel;
    a second proximal side panel extending between the second top panel and the second bottom panel; and
    a second distal side panel extending between the second top panel and the second bottom panel, wherein:
  the first light-trapping media contacts the first distal side panel;
  the second light-trapping media contacts the second distal side panel;
  when in the closed positions, the first door member and the second door member cover the ventilation port, and when in the open positions, the first door member and the second door member expose the ventilation port;
  when in the closed positions, the first distal side panel of the first door member and the second distal side panel of the second door member define an air gap, the air gap defined such that no imaginary straight line can pass from the exterior side to the interior side without intersecting at least one of the first door member and the second door member; and
  the air gap allows ventilation air to pass through, but does not allow ambient exterior light to pass through.

2. The apparatus according to claim 1, wherein the first distal side panel and the second distal side panel overlap one another with respect to a direction from the exterior side to the interior side and have complementary shapes to define the air gap.

3. The apparatus according to claim 2, wherein the complementary shapes each includes two planar sections disposed at an angle greater than 0° such that the air gap is defined to have a bend with the angle greater than 0°.

4. The apparatus according to claim 2, wherein the complementary shapes each includes a curved section such that the air gap is defined to have a correspondingly curved section.

5. The apparatus according to claim 2, wherein the complementary shapes each includes plural planar sections disposed at angles greater than 0° such that the air gap is defined to have one or more corresponding bends.

6. The apparatus according to claim 2, wherein the first light-trapping media and the second light-trapping media are formed of fins of a non-linear shape, and the complementary shapes of the first distal side panel and the second distal side panel are similar to the non-linear shape of the fins.

7. The apparatus according to claim 1, wherein surfaces of the first distal side panel and the second distal side panel have light-absorbing characteristics.

8. The apparatus according to claim 1, wherein first door member has a width from the first proximal side panel to the first distal side panel that is longer than that of the second door member.

9. The apparatus according to claim 1, wherein each of the first door member and the second door member includes a central opening for receiving the first or second light-trapping media.

10. The apparatus according to claim 9, wherein the first door member and the second door member each includes a ridge or flange no more than one-half inch from an outer edge toward the central opening.

11. A dark-out apparatus for use with a ventilation fan disposed on the wall of an agricultural building, the wall having an interior side and an exterior side, with a ventilation port passing through the wall from the exterior side to the interior side, the ventilation fan being mounted on the exterior side of the wall for passing ventilation air from one side to the other, the dark-out apparatus comprising:
  a first door comprising four panels defining a central space;
  a first light-trapping media having a light-trapping function, the first light-trapping media being movable relative to the wall between an open position and a closed position and being openable away from the wall, the first light-trapping member medium having interior and exterior faces, the first light-trapping media configured to be received in the central space of the first door and contact each of the panels of the first door; and
  a second door comprising four panels defining a central space;
  a second light-trapping media having a light-trapping function, the second light-trapping media being movable relative to the wall between an open position and a closed position and being openable away from the wall, the second light-trapping media having interior and exterior faces, the second light-trapping media configured to be received in the central space of the second door and contact each of the panels of the second door, wherein:
  when in the closed positions, the first light-trapping media and the second light-trapping media cover the ventilation port, and when in the open positions, the first light-trapping media and the second light-trapping media expose the ventilation port;
  when in the closed positions, a distal side panel of the first door and a distal side panel of the second door define an air gap therebetween; and
  the air gap allows ventilation air to pass therethrough while having a light trapping effect.

12. The apparatus according to claim 11, wherein the air gap is defined such that no imaginary straight line can pass from the exterior side to the interior side without intersecting at least one of the first light-trapping media and the second light-trapping media.

13. The apparatus according to claim 11, wherein the distal side panel of the first door and the distal side panel of the second door overlap one another with respect to a direction from the exterior side to the interior side and have complementary shapes to define the air gap.

14. The apparatus according to claim 13, wherein the complementary shapes each includes two planar sections disposed at an angle greater than 0° such that the air gap is defined to have a bend with the angle greater than 0°.

15. The apparatus according to claim 13, wherein the complementary shapes each includes a curved section such that the air gap is defined to have a correspondingly curved section.

16. The apparatus according to claim 13, wherein the complementary shapes each includes plural planar sections disposed at angles greater than 0° such that the air gap is defined to have one or more corresponding bends.

17. The apparatus according to claim 11, wherein surfaces of the distal side panel of the first door and the distal side panel of the second door have light-absorbing characteristics.

18. The apparatus according to claim 11, wherein the first door has a width from a proximal side to the distal side panel of the first door that is longer than that of the second door.

19. The apparatus according to claim 11, wherein a peripheral section of the first door and the second door extends no more than one-half inch from an outer edge toward the central opening of the respective first door and the second door.

* * * * *